United States Patent [19]

Ansberry et al.

[11] Patent Number: 5,640,540
[45] Date of Patent: Jun. 17, 1997

[54] METHOD AND APPARATUS FOR TRANSLATING KEY CODES BETWEEN SERVERS OVER A CONFERENCE NETWORKING SYSTEM

[75] Inventors: Catherine Malia Ansberry, Redmond; Jay D. Freer, Bellevue; Todd W. Fuqua, Redmond, all of Wash.

[73] Assignee: International Business Machines Corporation, Armonk, N.Y.

[21] Appl. No.: 387,506

[22] Filed: Feb. 13, 1995

[51] Int. Cl.[6] .............................. G06F 9/455; C09B 5/00
[52] U.S. Cl. ................ 395/500; 395/200.2; 395/200.04; 395/200.01; 395/326; 395/806; 395/670; 370/260; 379/202
[58] Field of Search ...................... 395/500, 600, 395/700, 200, 425, 161, 159, 160, 725, 650, 153, 800, 200.04, 200.2, 200.03, 200.01; 364/514 C, 222.81–222.82, 228.3–228.5, 231, 264, 189; 380/25, 23, 4; 379/89, 84, 100, 202, 204, 269; 345/119, 146, 156, 2, 168; 341/26

[56] References Cited

U.S. PATENT DOCUMENTS

| | | | |
|---|---|---|---|
| 4,129,859 | 12/1978 | Iwamura et al. | 345/123 |
| 4,442,295 | 4/1984 | Sukonick | 548/505 |
| 4,533,910 | 8/1985 | Sukonick et al. | 345/118 |
| 4,642,790 | 2/1987 | Minshull et al. | 395/158 |
| 4,738,407 | 4/1988 | Dumas | 379/96 |
| 4,780,821 | 10/1988 | Crossley | 395/500 |
| 4,796,201 | 1/1989 | Wake | 395/130 |
| 4,825,354 | 4/1989 | Agrawal et al. | 395/600 |
| 4,831,556 | 5/1989 | Oono | 395/157 |
| 4,845,644 | 7/1989 | Anthias et al. | 395/157 |
| 4,860,217 | 8/1989 | Sasaki et al. | 395/125 |
| 4,893,326 | 1/1990 | Duran et al. | 348/17 |
| 4,937,856 | 6/1990 | Natarajan | 379/158 |
| 4,939,509 | 7/1990 | Bartholomew et al. | 342/2 |
| 4,953,159 | 8/1990 | Hayden et al. | 370/62 |
| 4,974,173 | 11/1990 | Stefik et al. | 395/153 |
| 5,062,040 | 10/1991 | Bishop et al. | 395/650 |
| 5,065,347 | 11/1991 | Pajak et al. | 395/159 |
| 5,086,503 | 2/1992 | Chung et al. | 395/700 |
| 5,119,319 | 6/1992 | Tanenbaum | 364/514 A |
| 5,142,622 | 8/1992 | Owens | 395/500 |
| 5,148,154 | 9/1992 | MacKay et al. | 345/119 |
| 5,148,521 | 9/1992 | Ebbers et al. | 395/155 |
| 5,175,854 | 12/1992 | Cheung et al. | 395/60 |
| 5,179,652 | 1/1993 | Rozmanith et al. | 395/155 |

(List continued on next page.)

OTHER PUBLICATIONS

D.M. Chess et al., IBM Technical Disclosure Bulletin, vol. 30, No. 6, Nov. 1987.
P.A. Appino et al., IBM Technical Disclosure Bulletin, vol. 35, No. 4A, Sep. 1992.
S.P. Thompson, IBM Technical Disclosure Bulletin, vol. 36, No. 06B, Jun. 1993.

*Primary Examiner*—Kevin J. Teska
*Assistant Examiner*—Jacques Louis-Jacques
*Attorney, Agent, or Firm*—Ingrid M. Foerster; Andrew J. Dillon

[57] ABSTRACT

A conference-enabled X application gets distributed to many different X servers, each of which may have different keyboard configurations. Each X server may have a unique range of key codes and a unique keysym to key code mapping. X protocol contains keyboard information in the form of key codes and a modifier bitmask that indicates which key code modifiers, such as the Shift key, are set along with the key code. In order for the conference-enabled X application to interpret the key codes in the protocol correctly, the X conference-enabler provides a technique to translate the key codes between the various X servers in the conference. The method it uses involves querying the keysym that a specific key code/modifier combination is interpreted as on one X server and then finding a valid key code/modifier combination on another X server that has the same keysym. This translation of key codes allows an X application to be used in a conference among X servers with different keyboards and different keysym to key code mappings.

8 Claims, 2 Drawing Sheets

U.S. PATENT DOCUMENTS

| | | | |
|---|---|---|---|
| 5,191,644 | 3/1993 | Takeda | 395/158 |
| 5,193,168 | 3/1993 | Corrigan et al. | 395/600 |
| 5,195,086 | 3/1993 | Baumgartner et al. | 370/62 |
| 5,197,143 | 3/1993 | Lary et al. | 364/DIG. 2 |
| 5,197,147 | 3/1993 | Long et al. | 395/500 |
| 5,214,784 | 5/1993 | Ward et al. | 395/800 |
| 5,218,697 | 6/1993 | Chung | 395/650 |
| 5,241,625 | 8/1993 | Epard et al. | 395/163 |
| 5,247,670 | 9/1993 | Matsunaga | 395/650 |
| 5,249,287 | 9/1993 | MacDonald et al. | 395/500 |
| 5,249,290 | 9/1993 | Heiser | 395/650 |
| 5,280,583 | 1/1994 | Nakayama et al. | 395/200.04 |
| 5,289,574 | 2/1994 | Sawyer | 395/157 |
| 5,293,619 | 3/1994 | Dean | 395/650 |
| 5,305,449 | 4/1994 | Ulenas | 395/500 |
| 5,313,614 | 5/1994 | Goettlemann et al. | 395/500 |
| 5,341,499 | 8/1994 | Doragh | 395/650 |
| 5,390,314 | 2/1995 | Swanson | 395/650 |
| 5,392,400 | 2/1995 | Berkowitz et al. | 395/650 |
| 5,404,493 | 4/1995 | Bolme et al. | 395/500 |
| 5,440,744 | 8/1995 | Jacobson et al. | 395/650 |

METHOD AND APPARATUS FOR TRANSLATING KEY CODES BETWEEN SERVERS OVER A CONFERENCE NETWORKING SYSTEM

CROSS-REFERENCE TO RELATED APPLICATION

The present application is related to U.S. patent application Ser. No. 08-387,500, entitled *Method and System For Switching Between Users In A Conference Enabled Application*, U.S. patent application Ser. No. 08-387,502, entitled *Method For Managing Top-Level Windows Within A Conferencing Network System*, U.S. patent application Ser. No. 08-387,501, entitled *Management And Classification of Events For An X Windows Conferencing Enabler*, U.S. patent application Ser. No. 08-387,503, entitled *Method For Managing Visual Type Compatibility In A Conferencing Network System Having Heterogeneous Hardware*, U.S. patent application Ser. No. 08-387,504, entitled *Method To Support Applications That Allocate Shareable Or Non-Shareable Colorcells In A Conferencing Network System Having A Heterogeneous Hardware Environment*, U.S. patent application Ser. No. 08-387,505, , entitled *Method For Managing Pixel Selection In A Network Conferencing System*, all filed of even date herewith by the inventors hereof and assigned to the assignee herein, and incorporated by reference herein.

BACKGROUND OF THE INVENTION

1. Technical Field

The present invention relates, generally, to conference enabled networking systems and, more specifically, to a conference enabled networking system that distributes an application across a server network having heterogeneous keyboard configurations. More specifically still, the present invention relates to a method and apparatus for providing translations of key codes that allow the application to be used in a conference among the servers having different keyboards.

2. Description of the Related Art

The X Windows system implements a two-dimensional, interactive graphics environment using a distributed, client/server architecture. An X application (client) connects to the X server and communicates with it using X protocol. When an X application is conference-enabled, the application connects to an X Window conference-enabler rather than the X server. An X Window conference-enabler appears to the application to be an X server, while at the same time appearing to the X server as an application. The X Windows conference-enabler connects to multiple X servers on behalf of the application, distributing the application requests to each of the X servers. The effect is that the application is distributed to each display, and each participant in the conference may interact with the distributed application. The application is not aware that it is being distributed to multiple X servers.

The keyboard is one area that X has generalized so that X applications are made portable across different hardware systems. Physical keys on the keyboard are represented as key codes in X protocol. A key code is just number ranging from 8 to 255. The key code assigned to a particular physical key is server dependent. Key codes are most often used in KeyPress and KeyRelease events which are generated whenever someone presses and releases a key. In addition to the key codes, these events also contain a bitmask which indicates which set of modifiers (such as the Shift or Control keys) were pressed just prior to the event. X applications will usually not use key codes directly but rather interpret the key code/modifier combination into a more meaningful keysym.

A keysym is a defined constant that represents a certain character. An X server maintains a mapping between keysyms and key codes that is global to all X applications connected to it. An X server makes no interpretation of this mapping; it stores the mapping so that X applications may use it to translate the key codes and modifiers of events into keysyms. There may be several keysyms mapped to a single key code. For instance, the key code for the "a" key on a keyboard has the "a" keysym mapped to it as well as the "A" keysym that is used when the Shift or Shift Lock is pressed.

When an X application is conference-enabled, the X servers in the conference may have a different set of key codes and/or a different set of keysym to key code mappings. If the X conference-enabler did not translate the key codes in any protocol, then participants in a conference would not be able to provide the keyboard input they expect to the application. In addition, since a key code on one X server may be invalid on a different X server, some key codes in the X protocol may produce errors that could cause the conference-enabled X application to terminate abnormally.

In order for the conference-enabled X application to interpret the key codes in the protocol correctly, the X conference-enabler must provide a means to translate the key codes between the various X servers in the conference. Accordingly, what is needed is a method and apparatus for translating key codes between the various X servers in the conference.

SUMMARY OF THE INVENTION

It is therefore one object of the present invention to provide conference enabled networking systems.

It is another object of the present invention to provide a conference enabled networking system that distributes an application across a server network having heterogeneous keyboard configurations.

It is yet another object of the present invention to provide a method and apparatus for providing translations of key codes that allow the application to be used in a conference among the servers having the different keyboards.

The foregoing objects are achieved as is now described. According to the present invention, a conference-enabled X application gets distributed to many different X servers, each of which may have different keyboard configurations. Each X server may have a unique range of key codes and a unique keysym to key code mapping. X protocol contains keyboard information in the form of key codes and a modifier bitmask that indicates which key code modifiers, such as the Shift key, are set along with the key code. In order for the conference-enabled X application to interpret the key codes in the protocol correctly, the X conference-enabler provides a means to translate the key codes between the various X servers in the conference. The method it uses involves querying the keysym that a specific key code/modifier combination is interpreted as on one X server and then finding a valid key code/modifier combination on another X server that has the same keysym. This translation of key codes allows an X application to be used in a conference among X servers with different keyboards and different keysym to key code mappings.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
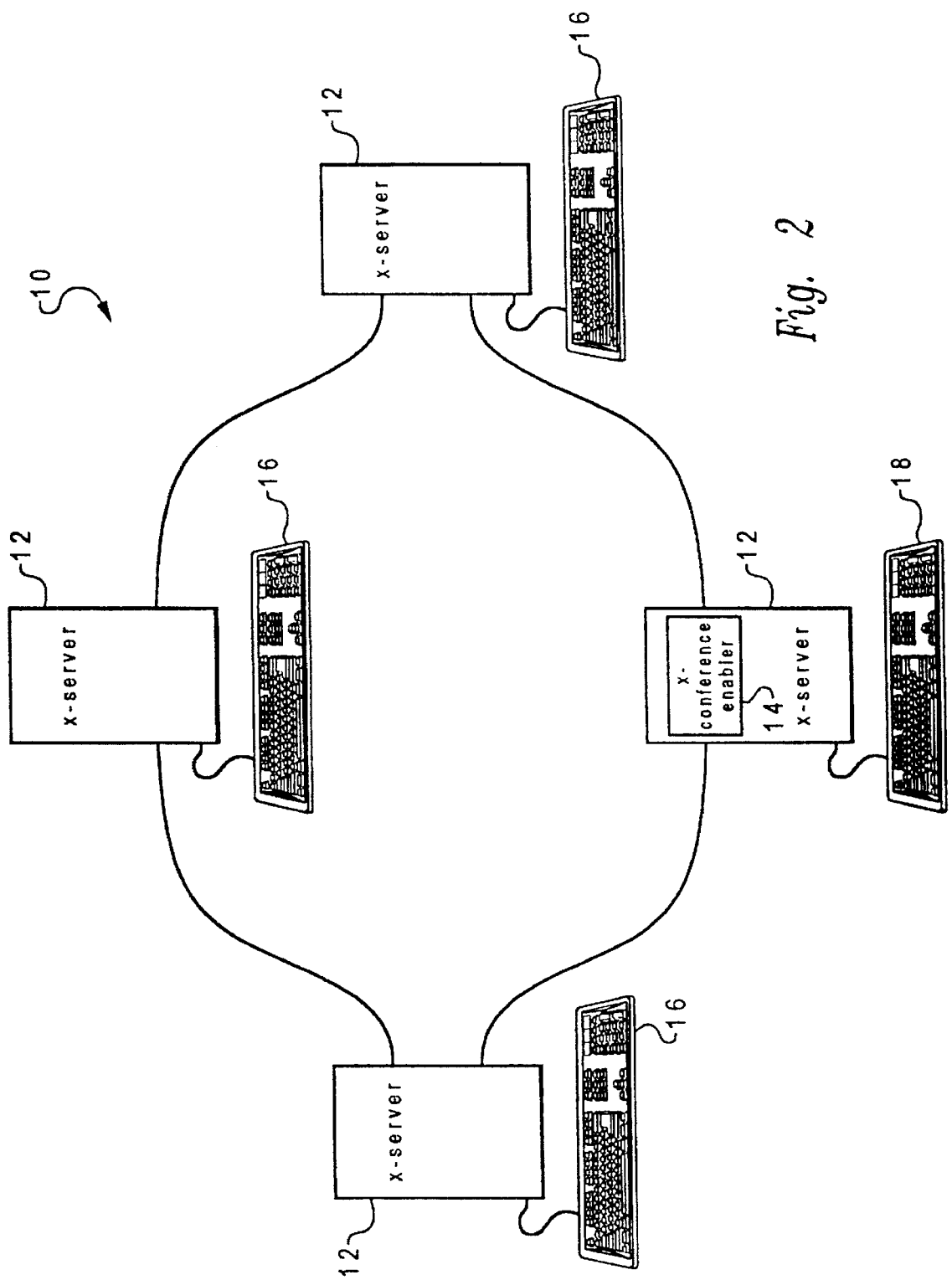
FIG. 2 depicts a conferencing networking system having a plurality of X servers which may be utilized to implement the method and system of the present invention.

As illustrated in FIG. 2, present invention operates on a conferencing networking system 10 having a plurality of X servers 12 as disclosed in commonly assigned co-pending patent application *A Method And System For Switching Between Users In A Conference Enabled Application*, Ser. No. 08/387,500, herein incorporated by reference for all purposes. One of the X servers 12 in the conference is assigned the role as the master. To the conference-enabled X application, the X conference-enabler 14 appears as the master X server. When the conference-enabler is translating key codes between participants, it must translate a key code from a participant's keyboard 16 to a key code on the master's keyboard 18, and vice-versa. For requests coming from the X application, key codes get translated from the master's X server to the participant's X server. Replies and events get translated from the participant's X server to the master's X server.

There are two types of X protocol that require key code translations. The first protocol contains a key code only. The second protocol contains a key code and a bitmask representing a set of modifier keys. The translations for each of these types are performed in a similar manner. The translation for protocol containing just a key code is treated as if it were the second type of protocol by using a null set of modifiers. That is, a single key code in the protocol is assumed to mean a key without any modifiers. No translation is done on the modifiers in this case.

To do the translation, the X conference-enabler first queries which keysym is mapped to the key code/modifier combination on the X server from which the translation is being done. This keysym represents the value that the X application would use in the absence of an X conference-enabler. The X conference-enabler then searches the keysym/key code mapping on the other X server to find the key code that has the same keysym mapped to it. The X conference-enabler has thus found a new key code to be used in place of the original in the key code/modifier combination.

In most cases, when the keysym to key code mappings are similar between the X servers, the new key code used with original modifier set produces the desired results. To make sure, however, that the new key code/modifier combination produces the same keysym as the original set, the X conference-enabler queries the keysym for this combination on the X server to which the translation is being done. If the keysym is not the same, then that means that the original set of modifiers does not work when used in conjunction with the new key code. The X conference-enabler must find a new set of modifiers to be used to which the translation is being done. Essentially, it must now translate the modifiers to a new value.

To understand how the modifier translation works, the use of the keysym to key code mappings must first be understood. As said before, there is a list of keysyms associated with each key code. The list is always treated as if there are at least four elements in the list. If the list (ignoring trailing NoSymbol entries) is a single keysym "K", then the list is treated as if it were the list "K NoSymbol K NoSymbol." If the list is a pair of keysyms "K1" and "K2", then the list is treated as if it were the list "K1 K2 K1 K2." If there are three keysyms defined for the key code, then the list is treated as if it were the list "K1 K2 K3 NoSymbol."

These first four elements in the list are divided into two groups. The first group contains the first two keysyms in the list. The second group contains the third and fourth keysyms. When looking up a keysym for a key code/modifier combination, an application uses the first group of keysyms unless the group modifier (in the modifier bitmask) is set to on, in which the case the second group of keysyms will be used.

Within a group, the modifier bitmask also determines which keysym to use. The first keysym is used when the Shift and Lock modifiers are off. The second keysym is used when the Shift modifier is on, or when the Lock modifier is on and the second keysym is upper-case alphabetic, or when the Lock modifier is on and interpreted as Shift Lock. Otherwise, when the Lock modifier is on and interpreted as Caps Lock, the state of the Shift modifier is applied first to select a keysym, but if that keysym is lower-case alphabetic, then the corresponding upper-case keysym is used instead.

Basically, by using the position of a keysym in the list, one can determine which modifiers may be used with a certain key code to that keysym. The first keysym in the list is used when no modifiers are set. The second keysym in the list is used when the Shift modifier is set. The third keysym is used when the group modifier is set and the Shift modifier is not set. The fourth keysym is used when both the group modifier and the Shift modifier are set. The X conference-enabler uses these principles to build a new set of modifiers.

In the last translation step described, the X conference-enabler had found a new key code by searching the list of keysyms per key code for a certain keysym. The X conference-enabler sets the new modifier based on which position in the list that it found the keysym. For instance, say the keysym it was searching for happened to be in the second position in the list. The new modifier would be set to contain the Shift modifier in this case. To make the new modifier bitmask look like the original modifier bitmask, the X conference-enabler will then add each modifier of the original bitmask to the new one as long as it does not modify the value of the keysym produced when used with the new key code.

If none of the key code translations described above is successful, then the X conference-enabler will map the original key code to a key code that has a NoSymbol keysym mapped to it. The NoSymbol keysym is a special keysym that applications interpret as meaning no keysym is mapped to that key. By translating key codes to a key with a meaning of NoSymbol, the X conference-enabler prevents errors from being generated due to the original key code being invalid and thus prevents any harm being done to the application. At worst, a participant's input will get ignored by the application.

Thus, the conference-enabled X application "thinks" that it is running on the master X server in the conference. The application uses that X server's key codes and keysym to key code mapping. Thus, in order for a participant in the conference to be able to successfully interact with a conference-enabled application, any key combinations that they press must correspond to a keysym on their X server that is also available on the master X server. Otherwise, the translation would fail and the key combination that would get translated to the NoSymbol case.

Figure 1:
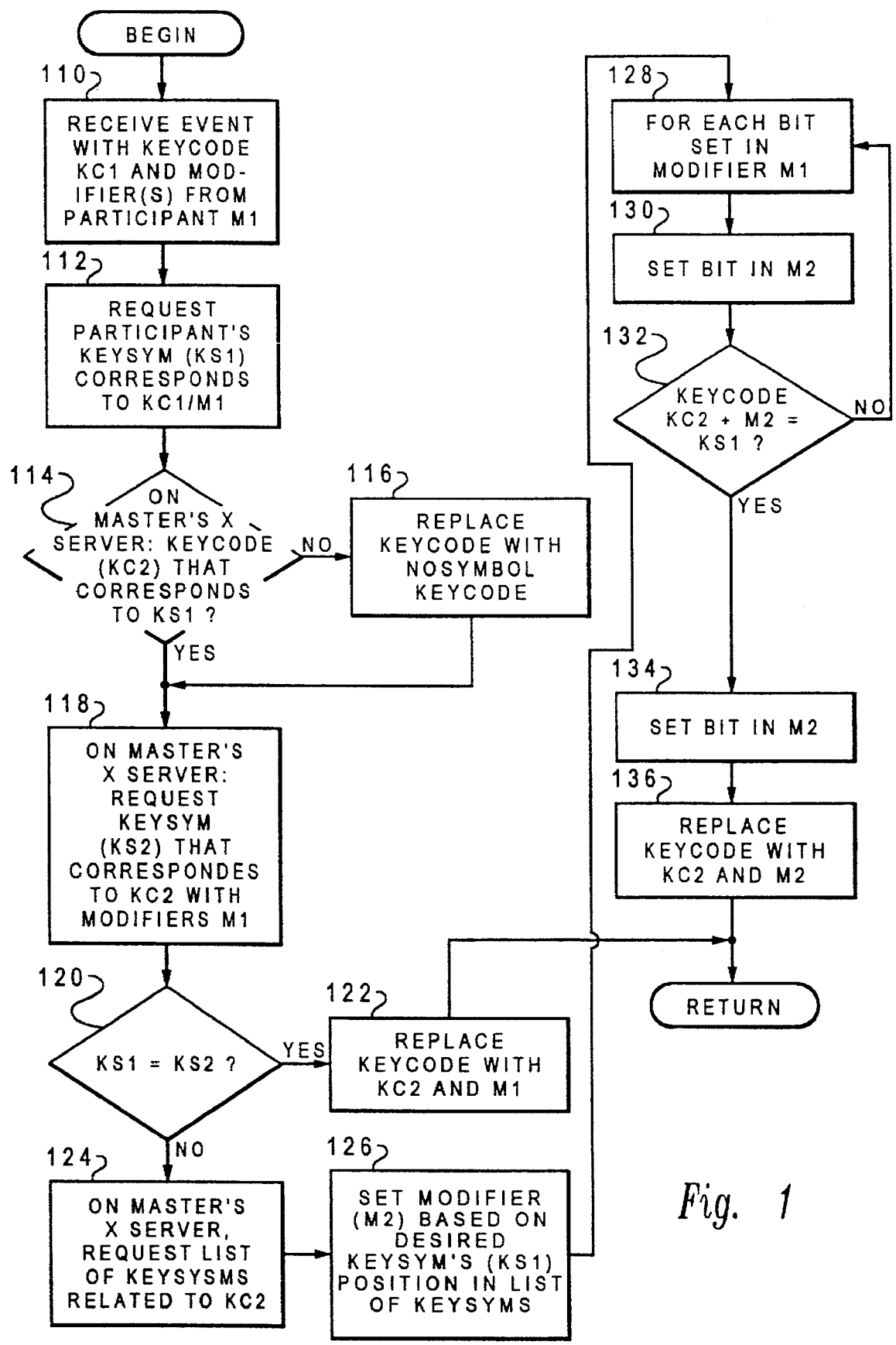
FIG. 1 depicts a method of providing key code translation from a participant to a master in accordance with a preferred embodiment of the present invention.

A method of providing key code translation from a participant to a master is disclosed in the flowchart illustrated in FIG. 1. In step 110, the conference enabler receives an event with the key code KC1 and a modifier, or modifiers, from a participant M1. Next, in step 112, the enabler requests that the participant's key symbol, keysym (KS1), corresponds to KC1/M1. Next, in step 114, the master's X server selects a second key code (KC2) that corresponds to KS1, but if it is not available, in step 116, the master's X server replaces the key code with NoSymbol key code.

If KC2 corresponds to KS1, then, in step 118, the master's X server requests the keysym (KS2) that corresponds to KC2 with modifiers M1. Next, in step 120, the master determines if KS1 is equivalent to KS2 and, if so, replaces the key code, in step 122, with KC2 and M1. Otherwise, in step 124, the master's X server requests a list of keysyms related to KC2. Next, in step 126, the master's X server sets the modifier (M2) based on a desired keysym's (KS1) position in the list of keysyms.

Then, for each bit set in modifier M1 (step 128), the bit is set in modifier M2 in step 130. Then, in step 132, the system determines if the key code KC2 plus M2 results in KS1 and, if not, returns to step 128. If the results of KS1 are found, then, in step 134, the system sets the bit in M2. Following which, the system returns to repeat steps 128–134 until all bits have been set. In step 136, the system replaces the key code with KC2 and M2 before returning.

While the invention has been particularly shown and described with reference to a preferred embodiment, it will be understood by those skilled in the art that various changes in form and detail may be made therein without departing from the spirit and scope of the invention.

We claim:

1. In a networking system that distributes an application to a plurality of servers in a conference mode, wherein selected servers have a particular keyboard configuration, a method for translating key codes between selected of the plurality of servers having different keyboard configurations, the method comprising the steps of:

determining a specific keysym for a selected key code on a source server while said application is in said conference mode by:
requesting said specific keysym for said destination server;
requesting said destination server's keycode corresponding to said specific keysym; and mapping said specific keysym on said source server to a valid key code on a destination server having the same key symbol.

2. The method according to claim 1 wherein said step of mapping said specific key code further comprises the step of:

modifying said key symbol with a first modifier corresponding to said specific key code.

3. In a networking system that distributes an application to a plurality of servers in a conference mode, wherein selected servers have a particular keyboard configuration, a system for translating key codes between selected of the plurality of servers having different keyboard configurations, the system comprising:

means, coupled to said networking system, for determining a specific keysym for a selected key code on a source server by requesting said specific keysym for said destination server and requesting said destination server's keycode corresponding to said specific keysym; and means, coupled to said determining means, for mapping said specific keysym on said source server to a valid key code on a destination server having the same key symbol.

4. The system according to claim 3 wherein said means for mapping said specific key code further comprises:

means for modifying said key symbol with a first modifier corresponding to said specific key code.

5. In a network computer program product that distributes an application to a plurality of servers in a conference mode, wherein selected servers have a particular keyboard configuration, a computer program product for translating key codes between selected of the plurality of servers having different keyboard configurations, the computer program product comprising:

computer usable code means for determining a specific keysym for a selected key code on a source server by requesting said specific keysym for said destination server and said destination server's keycode corresponding to said specific keysym while said application is in said conference mode; and computer usable code means for mapping said specific keysym on said source server to a valid key code on a destination server having the same key symbol.

6. The invention according to claim 5 wherein said computer usable code means for mapping said specific key code further comprises:

computer usable code means for modifying said key symbol with a first modifier corresponding to said specific key code.

7. A method of distributing an application to a plurality of servers in a networking system comprising:

while said application is in a conference mode among a plurality of users having different keyboard configurations over said networking system, translating key codes between selected of the plurality of servers having different keyboard configurations by:
determining a specific keysym for a selected keycode on a source server by requesting said specific keysym for said destination server and requesting said destination server's keycode corresponding to said specific keysym; and mapping said specific keysym on said source server to a valid keycode on a destination server having the same key symbol.

8. The method according to claim 7 wherein said step of mapping said specific key code further comprises:

modifying said key symbol with a first modifier corresponding to said specific key code.

* * * * *